(12) United States Patent
Eskandari et al.

(10) Patent No.: US 12,304,013 B2
(45) Date of Patent: May 20, 2025

(54) SYSTEMS AND METHODS FOR SEAM TRACKING IN PIPE WELDING

(71) Applicant: Novarc Technologies Inc., North Vancouver (CA)

(72) Inventors: Neda Eskandari, North Vancouver (CA); Neda Parnian, North Vancouver (CA); Ehsan Moosavimehr, North Vancouver (CA); Abdolreza Abdollahi, North Vancouver (CA); Mark Lowson, North Vancouver (CA)

(73) Assignee: NOVARC TECHNOLOGIES INC., North Vancouver (CA)

( * ) Notice: Subject to any disclaimer, the term of this patent is extended or adjusted under 35 U.S.C. 154(b) by 1128 days.

(21) Appl. No.: 15/733,480

(22) PCT Filed: Feb. 8, 2019

(86) PCT No.: PCT/CA2019/050168
§ 371 (c)(1),
(2) Date: Aug. 6, 2020

(87) PCT Pub. No.: WO2019/153090
PCT Pub. Date: Aug. 15, 2019

(65) Prior Publication Data
US 2021/0069813 A1    Mar. 11, 2021

Related U.S. Application Data

(60) Provisional application No. 62/628,009, filed on Feb. 8, 2018.

(51) Int. Cl.
*B23K 9/095* (2006.01)
*B23K 9/028* (2006.01)
(Continued)

(52) U.S. Cl.
CPC .......... *B23K 9/0956* (2013.01); *B23K 9/1274* (2013.01); *B23K 9/0953* (2013.01); *B23K 9/32* (2013.01); *B23K 2101/10* (2018.08)

(58) Field of Classification Search
CPC .......... B23K 9/09; B23K 9/093; B23K 9/095; B23K 9/0956; B23K 9/10; B23K 9/1087;
(Continued)

(56) References Cited

U.S. PATENT DOCUMENTS 4,733,051 A    3/1988  Nadeau et al.
4,788,409 A *  11/1988  Yamade ................. B23K 10/02
                                                    219/121.45

(Continued)

FOREIGN PATENT DOCUMENTS

CN    101214574 A    7/2008
CN    102653022 A    9/2012
(Continued)

OTHER PUBLICATIONS

Third Office Action and Search Report issued in connection with Chinese Patent Application No. 201980012065.9, China National Intellectual Property Administration, Feb. 17, 2023.
(Continued)

*Primary Examiner* — Eric S Stapleton
(74) *Attorney, Agent, or Firm* — Borden Ladner Gervais; Richard A. Johnson (57) ABSTRACT

The present disclosure provides a method for controlling a robotic welding system to weld pipe sections wherein the pipe sections are held in fixed relation to each other by a plurality of stitches at a seam between the pipe sections. The method comprises rotating the pipe sections so a camera may determine the seam position, moving a torch arm and welding torch so that the torch is over one of the plurality of stitches, adjusting welding parameters and determining
(Continued)

stitch start when welding torch is over a stitch and further adjusting welding parameters and determining stitch end when welding torch moves past one of the plurality of stitches.

10 Claims, 7 Drawing Sheets

(51) Int. Cl.
  *B23K 9/127* (2006.01)
  *B23K 9/32* (2006.01)
  *B23K 37/0538* (2025.01)
  *B25J 9/16* (2006.01)
  *B23K 101/10* (2006.01)

(58) Field of Classification Search
  CPC .......... B23K 9/12; B23K 9/32; B23K 9/0286; B23K 37/0538; B23K 9/1274; B23K 2101/06; B23K 9/0953; B23K 2101/10; B25J 9/1684
  USPC ...................................................... 219/124.34
  See application file for complete search history.

(56) References Cited

U.S. PATENT DOCUMENTS

| | | | |
|---|---|---|---|
| 5,959,425 | A | 7/1999 | Bieman et al. |
| 6,049,059 | A | 4/2000 | Kim |
| 2004/0217096 | A1* | 11/2004 | Lipnevicius ....... B23K 37/0538 219/125.11 |
| 2010/0006627 | A1* | 1/2010 | Bonelli ................ B23K 9/0286 228/101 |
| 2011/0186556 | A1* | 8/2011 | Heinrich .............. B23K 9/0282 219/136 |
| 2012/0231160 | A1* | 9/2012 | Leiden ..................... B05D 3/02 427/340 |
| 2013/0119040 | A1 | 5/2013 | Suraba et al. |
| 2015/0273604 | A1* | 10/2015 | Anderson .............. B23K 31/02 228/9 |
| 2016/0375524 | A1* | 12/2016 | Hsu ........................ B23K 26/03 228/8 |
| 2017/0001268 | A1* | 1/2017 | Jack ..................... B23K 9/0282 |
| 2017/0157693 | A1* | 6/2017 | Albrecht .............. B23K 9/0052 |
| 2018/0001422 | A1* | 1/2018 | Rajagopalan ........ B23K 26/282 |

FOREIGN PATENT DOCUMENTS

| | | | |
|---|---|---|---|
| CN | 104416305 | A | 3/2015 |
| CN | 104708239 | A * | 6/2015 |
| CN | 205254438 | U | 5/2016 |
| CN | 106660154 | A | 5/2017 |
| DE | 3150971 | A1 | 6/1983 |
| JP | H07266044 | A | 10/1995 |
| JP | H07276074 | A | 10/1995 |
| JP | H08267242 | A | 10/1996 |
| WO | 2015148355 | A1 | 10/2015 |
| WO | 2017/165964 | A1 | 10/2017 |

OTHER PUBLICATIONS

Extended European Search Report and Search Opinion issued in connection with European Patent Application No. 19751289.0, European Patent Office, Nov. 10, 2021.
Second Office Action and Search Report issued in connection with Chinese Patent Application No. 201980012065.9, China National Intellectual Property Administration, Jun. 28, 2022.
Office Action and Search Report issued in connection with Chinese Patent Application No. 201980012065.9, China National Intellectual Property Administration, Dec. 16, 2021.
Tecnar Automation Ltd., Rotoweld 3.0 brochure (http://www.tecnar.com/wp-content/themes/tecnar-oz/pdf/rotoweld_brochure.pdf).
Tecnar Automation Ltd., Rotoweld 3.0 user manual (http://www.tecnar.com/wp-content/themes/tecnar-oz/pdf/rotoweld_manual.pdf).
Bae, K.-Y. et al., An optical sensing system for seam tracking and weld pool control in gas metal arc welding of steel pipe, Journal of Materials Processing Technology 120 (2002), 458-465.
Shen, H-y et al., Arc welding robot system with seam tracking and weld pool control based on passive vision, The International Journal of Advanced Manufacturing Technology 39, 669-678 (2008).
Ma, Hongbo et al., Robot welding seam tracking method based on passive vision for thin plate closed-gap butt welding, The International Journal of Advanced Manufacturing Technology 48, 945-953 (2010).
Nele, L. et al., An image acquisition system for real-time seam tracking, The International Journal of Advanced Manufacturing Technology 69, 2099-2110 (2013).
International Search Report and Written Opinion for International Application No. PCT/CA2019/050168, International Searching Authority, May 27, 2019.
Communication pursuant to Article 94(3) EPC issued in connection with European Patent Application No. 19751289.0, European Patent Office, Oct. 11, 2022.
Decision on Rejection issued in connection with Chinese Patent Application No. 201980012065.9, China National Intellectual Property Administration, dated Oct. 7, 2023, 4 pages.
"Tracking research on world automotive technology development," China Society of Automotive Engineers, Beijing Polytechnic University, pp. 47-48, Aug. 31, 2007.
"Computer-assisted welding technology," Chen Bingsen, Machinery Industry Press, p. 248, Oct. 31, 1999.
Notice of Allowance issued on corresponding Canadian Patent Application No. 3,088,280 by the Canadian Intellectual Property Office, dated Feb. 13, 2024.
Fourth Office Action issued in connection with Chinese Patent Application No. 201980012065.9, China National Intellectual Property Administration, dated Jul. 19, 2023.
Communication under Rule 71(3) EPC issued in connection with European Patent Application No. 19751289.0, dated Jul. 6, 2023.

* cited by examiner

SYSTEMS AND METHODS FOR SEAM TRACKING IN PIPE WELDING

CROSS REFERENCE TO RELATED APPLICATIONS

This application is the U.S. national stage of International Application No. PCT/CA2019/050168 filed on Feb. 8, 2019, which in turn claims the benefit of priority of U.S. Provisional Patent Application No. 62/628,009 filed on Feb. 8, 2018. Both International Application No. PCT/CA2019/050168 and U.S. Provisional Patent Application No. 62/628,009 are hereby incorporated herein by reference in their entirety.

TECHNICAL FIELD

The present disclosure relates to welding of pipes and the like. Particular embodiments provide systems and methods for machine vision-based detection of features of a pipe weld seam and controlling a robotic welding system based on the detected features.

BACKGROUND

Tracking of welding seams using machine vision may be practiced using various types of imaging systems. In some systems, laser scanners are used, but the level of precision achieved using a laser scanner for pipe welding is limited.

Examples of prior art relating to the use of cameras for tracking welding operations include:
- Bae, K.-Y. T.-H.-C. (2002). An optical sensing system for seam tracking and weld pool control in gas metal arc welding of steel pipe. *Journal of Materials Processing Technology*, 458-465;
- Ma, H. e. (2010). Robot welding seam tracking method based on passive vision for thin plate closed-gap butt welding. The International Journal of Advanced Manufacturing Technology, 945-953;
- Nele, L. E. (2013). An image acquisition system for real-time seam tracking. The International Journal of Advanced Manufacturing Technology, 2099-2110;
- Shen, H.-y. e. (2008). Arc welding robot system with seam tracking and weld pool control based on passive vision. The International Journal of Advanced Manufacturing Technology, 669-678;
- U.S. Pat. No. 4,733,051;
- U.S. Pat. No. 5,959,425;
- U.S. Pat. No. 6,049,059;
- US Patent Application Publication No. 2013/0119040, and,
- Tecnar Automation Ltd., Rotoweld 3.0 (http://www-.tecnar.com/wp-content/themes/tecnar-oz/pdf/rotoweld_brochure.pdf; http://www.tecnar.com/wp-content/themes/tecnar-oz/pdf/rotoweld_manual.pdf).

There exists a need for improved systems and methods for monitoring welding operations and automatically adjusting welding parameters.

SUMMARY

One aspect provides a method for controlling a robotic welding system to automatically weld together two pipe sections in a spool welding operation wherein the two pipe sections are held in fixed relation to each other by a plurality of stitches at an interface between the two pipe sections, the robotic welding system having a torch arm holding a welding torch, a controller for controlling motion of the torch arm, and a processor operably coupled to the controller and a camera positioned to capture images of an area around a welding arc. The method comprises rotating the two pipe sections and the robotic welding system in relation to each other while continuously capturing and buffering a plurality of frames of an interface between the two pipe sections with the camera, processing the plurality of frames to determine a seam position, controlling robotic welding system to move the torch arm to track the seam position, processing the plurality of frames to detect whether the welding torch is over one of the plurality of stitches, determining a stitch start in response to detecting the welding torch moving over one of the plurality of stitches, controlling the robotic welding system to adjust welding parameters in response to determining the stitch start, determining a stitch end in response to detecting the welding torch moving past one of the plurality of stitches, and, controlling the robotic welding system to adjust welding parameters in response to determining the stitch end.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

The present disclosure provides novel systems and methods for monitoring pipe welding and automatically adjusting welding parameters. Example methods are described below for 1) root pass seam tracking and stitch start and end detection and 2) seam tracking for other passes. The examples described herein may be implemented with a camera attached to a torch holding arm of a welding robot, such that for vision-based seam tracking, it is only required to determine the position of the seam rather than computing the offset between the seam and the torch tip. In other embodiments a camera may be mounted at a different location, as discussed below.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
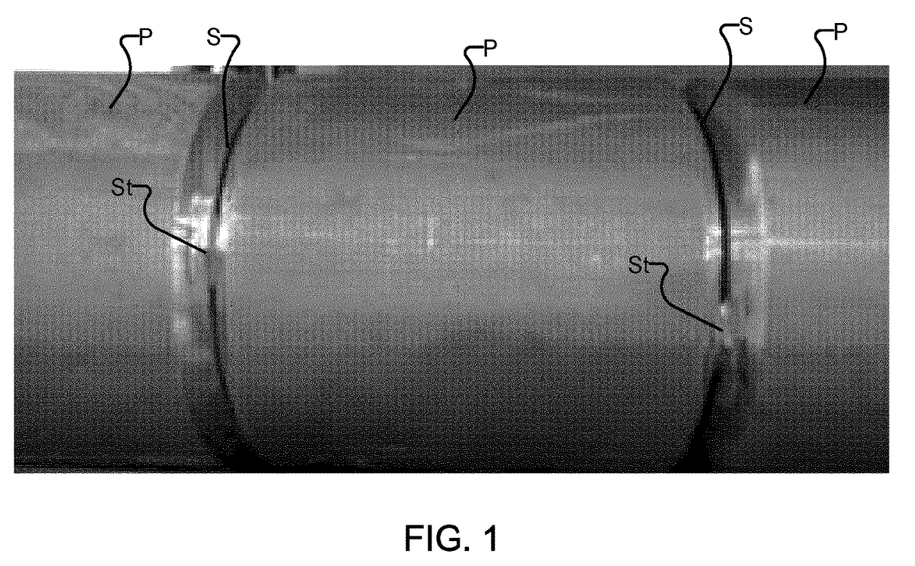
FIG. 1 is a photograph showing pipe sections stitched together in preparation for welding.

As discussed in detail below, methods used for seam detection during an initial pass (referred to as the root pass) are different than for the other passes (referred to as fill or cap passes). That is because of the existence of the stitches in the root pass. FIG. 1 is a photograph showing three example pipe sections P which have been prepared for welding. A seam S is located at the interface of each pair of adjacent pipe sections P, and a plurality of stitches St are located around each seam S to hold the sections together. For example, each seam S may have 3 stitches St spaced about the circumference, which may be evenly spaced (e.g. separated by about 120 degrees), or unevenly spaced. More or fewer than 3 stitches may be used depending on the pipe diameter and wall thickness.

Figure 2:
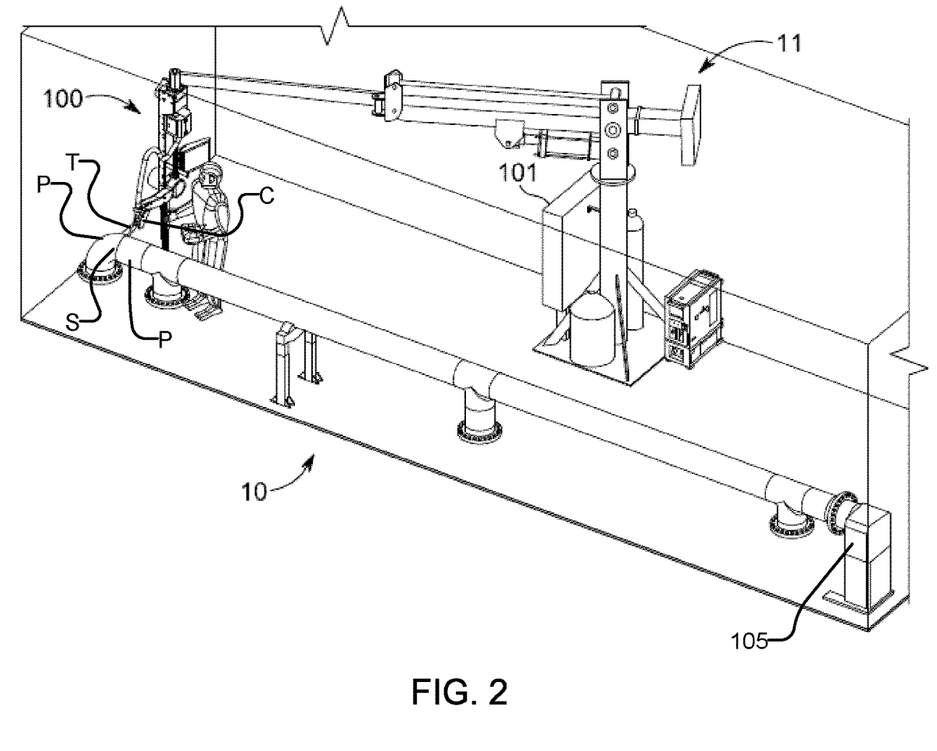
FIG. 2 shows an example system for performing an automatic pipe welding operation according to one embodiment.

FIG. 2 schematically illustrates an example system for automated welding utilizing a welding apparatus 10 wherein pipe sections P are mounted on a "positioner" 105 which rotates the pipe string in relation to a robotic welding system 100 mounted on a repositionable support structure 11. Details of an example robotic welding system 100 may be found in International (PCT) patent application publication No. WO 2017165964, which is hereby incorporated by reference herein. The robotic welding system 100 has a welding torch T and a camera C mounted on a torch arm, and the support structure 11 facilitates positioning the torch T at the seam S. In some embodiments, camera C is mounted on an underside of the torch arm. In other embodiments, camera C may be mounted on the top or one of the sides of the torch arm. Alternatively, camera C may be mounted at any other suitable location (e.g., on the robotic welding system 100, on a separate fixed support) so long as it has a view of the welding arc. A control cabinet 101 is operably connected to robotic welding system 100 and camera C, as described below.

Figure 2A:
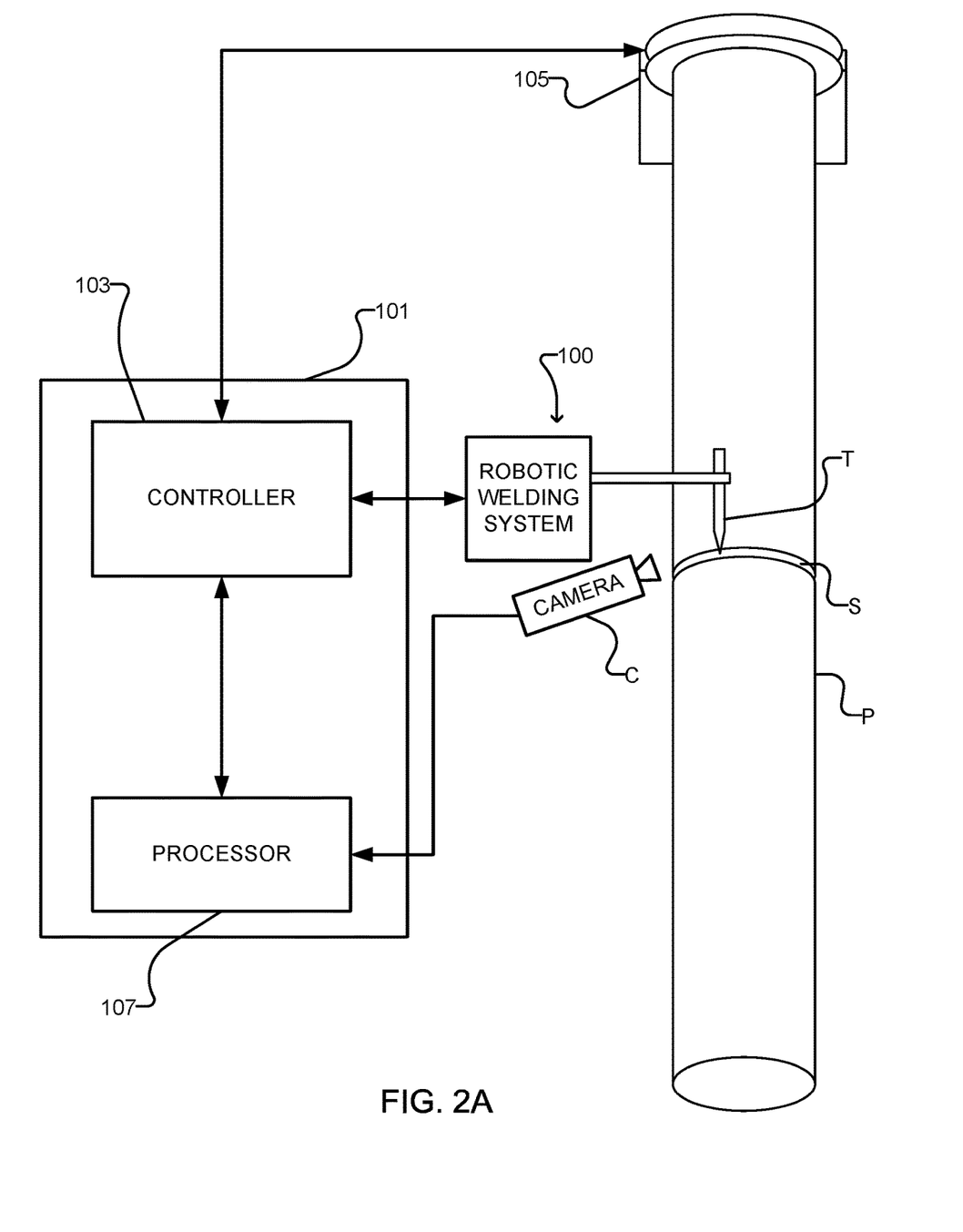
FIG. 2A is a block diagram schematically illustrating elements of the system of FIG. 2.

FIG. 2A schematically illustrates certain elements of the system of FIG. 2. The control cabinet 101 houses a controller 103 (e.g., a programmable logic controller or PLC) which controls the robotic welding system 100 to execute a welding pattern, and controls the positioner 105 to rotate the pipe sections P. The control cabinet 101 also houses a processor 107 (e.g. an industrial PC or IPC) connected to the camera C and controller 103. As described below, the processor 107 is configured to process images from the camera C and provide the controller 103 with signals based on the processed images for the controller to control the operation of the robotic welding system 100.

The camera C may comprise any camera with sufficient sensitivity and resolution to capture images with enough information to detect features for controlling the welding operation with a desired level of precision, as discussed below. The level of precision may depend on the intended implementation. For example, some embodiments provide a precision of at least 0.1 mm. Other embodiments may provide greater or lesser precision. For example, in situations where high precision is desired, cameras with higher resolution and/or sensitivity may be utilized, or in situations where less precision is needed cameras with lower resolution and/or sensitivity may be utilized.

In some embodiments the camera C comprises a near infrared (NIR) camera. In some embodiments the camera C comprises a high dynamic range (HDR) camera. In some embodiments the camera C comprises an HDR NIR camera. In an example embodiment wherein the camera C comprises an HDR NIR camera with a resolution of 2048×2048, a 12-bit depth, and a 75 mm lens, the processor is provided with images wherein each pixel corresponds to an area of about 0.02 mm by 0.02 mm, allowing for seam tracking with a precision of 0.1 mm or better. The camera C may be of different types, and may have a different resolution, bit depth, lens, or other parameters in other embodiments. In some embodiments the camera C comprises a stereo camera. In some embodiments multiple cameras C are operably coupled to the processor 107. In some embodiments a laser camera may also be provided in addition to camera C. In some embodiments two spot laser sensors may also be provided in addition to camera C for determining a distance between the torch T and the pipe sections P. In some embodiments different types of sensors may also be provided in addition to camera C, such as for example, proximity sensors, thermal sensors, electric or mechanical contact sensors, or other sensors.

Figure 3:
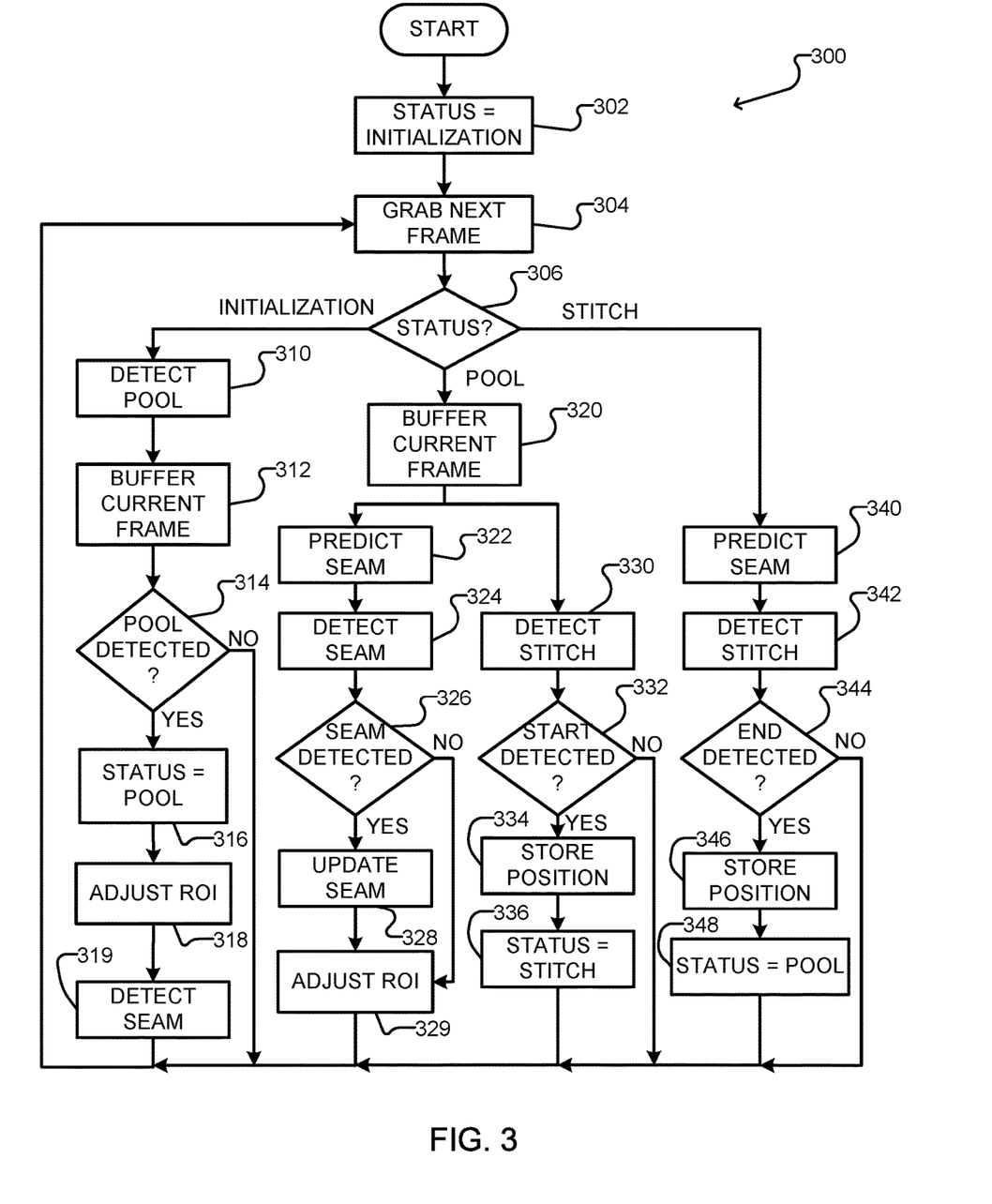
FIG. 3 is a flowchart illustrating steps of an example method for controlling a robotic welding system during an initial pass (which may be referred to as a "root" pass, welding together two pipe sections which are stitched together but not otherwise joined) according to one embodiment.

FIG. 3 is a flowchart illustrating steps of an example method 300 for monitoring a root pass of welding two pipe sections together, and automatically tracking the seam during the root pass. Method 300 may, for example be carried out by vision software running on a processor (e.g. processor 107) in communication with a controller (e.g. controller 103) for controlling a robotic welding system 100. Method 300 starts when the processor receives an "arc on" signal from the controller (which controls the robotic welding system to start the welding operation and controls the positioner to start rotating the pipe sections). At block 302 the processor sets a status to "Initialization", to indicate an initialization mode. In some embodiments, the welding torch is positioned over a stitch at the seam between the two pipe sections before starting the method 300, as described in the following paragraphs. In other embodiments, the welding torch may not be positioned over a stitch when the method 300 starts.

Figure 3A:
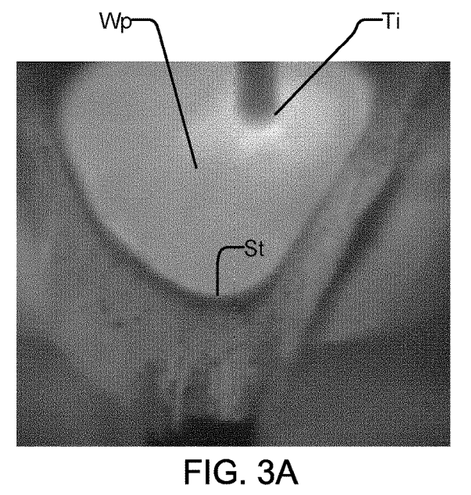
FIG. 3A shows an example stitch frame.
Figure 3B:
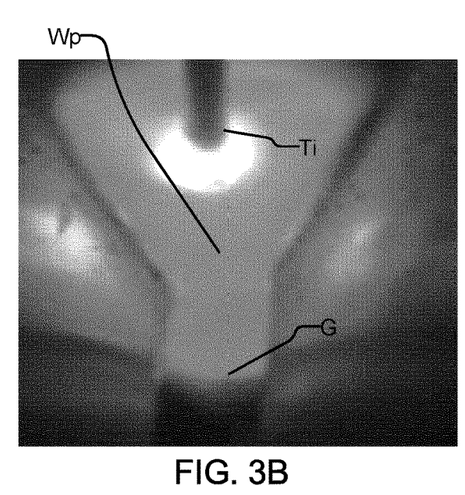
FIG. 3B shows an example non-stitch frame.

At block 304, the processor receives a frame from the camera. At block 306, the processor checks the status, which is initially set to "Initialization" so the method proceeds to block 310. At block 310 the processor analyzes the frame to detect if a weldpool is present within a seam gap (which will typically be the case unless the torch is over a stitch). FIG. 3A shows an example frame illustrating the tip Ti of the welding torch and a weldpool Wp atop a stitch St. FIG. 3B shows an example frame without a stitch wherein the weldpool Wp is within the gap G of the seam. In some embodiments, the detection of a pool at block 310 comprises utilizing a convolutional neural network which analyzes the current frame. In some embodiments, the detection at block 310 comprises template matching, or other image processing techniques. At block 312 the processor stores either all or a portion of the current frame in a buffer. In some embodiments, the processor stores a region of interest (ROI) in the buffer, the ROI comprising an area surrounding the brightest portion of the frame, which is where the welding arc is located.

At block 314, if a pool is detected in the current frame (block 314 YES output), the processor sets the status to "Pool" at block 316. At block 318 the processor adjusts the ROI for the images to be processed for seam detection. In some embodiments, the processor may not adjust the ROI and block 318 may be omitted. Adjusting the ROI at block 318 may, for example, comprise selecting an area of the image encompassing the welding arc and the edges of the pipe sections being welded. After block 318, the method proceeds to block 319, where the processor analyzes the image to detect the seam position. Seam position detection at block 319 may comprise, for example, detecting edges and/or lines in the image to locate the edges of the pipe sections being welded. In some embodiments, seam position detection at block 319 comprises spatially filtering the image. In some embodiments, seam position detection at block 319 comprises utilizing a convolutional neural network. In some embodiments, seam position detection at block 319 comprises template matching, or other image processing techniques. In some embodiments seam position detection at block 319 comprises determining a distance from the torch to the pipe sections based on signals from one or more other sensors, such as for example a laser scanner and/or a pair of spot laser sensors. In some embodiments, seam position detection at block 319 comprises determining a gap size between the edges of the pipe sections being welded. In some embodiments, seam position detection at block 319 comprises a combination of two or more of the foregoing acts. In a currently preferred embodiment, seam position detection at block 319 comprises localization of features using a convolutional neural network, temporally and/or spatially filtering and preprocessing the image, followed by detection of corners/edges and the processor determines a center line between the edges of the pipe sections being welded and determining a seam position at a location on the center line at a desired height above the edges of the pipe sections being welded. After block 319, or if a pool is not detected in the current frame (block 314 NO output), the method returns to block 304 where the processor reads the next frame.

At block 306, when the status is "Pool" the method proceeds to block 320 where the processor buffers some or all of the current frame. After block 320, the method proceeds to blocks 322 and 330. The steps at blocks 322 and 330 (as well as the subsequent steps, where applicable) are performed in parallel for each frame.

At block 322 the processor predicts a seam position. Prediction of seam location at block 322 may, for example, comprise utilizing a Kalman filter or a Particle filter based on the latest detected seam location. The filter utilized at block 322 may comprise, for example, a Standard Kalman Filter, Extended Kalman Filter, Unscented Kalman Filter, Fast Kalman Filter, Unscented Particle Filter, SIR Particle Filter, or other suitable filter. The filter may be designed based on a model of torch movement. In some embodiments, a random walk model may be used to model the movement of the torch (e.g. the filtering may use a model with an identity state transition matrix, with the value of process and measurement noises set accordingly). Prediction of seam location at block 322 may, for example, comprise utilizing a model of the torch movement stored in a memory accessible to the processor and/or feedback from the controller on the positioner and torch movements. The processor provides the controller with the predicted seam position for controlling the movement of the torch to track the seam.

At block 324, the processor analyzes the current frame, or a set of recently buffered frames, to detect the seam position. Seam position detection at block 324 may comprise, for example, detecting edges and/or lines in the buffered images to locate the edges of the pipe sections being welded. In some embodiments, seam position detection at block 324 comprises spatially filtering the buffered images. In some embodiments, seam position detection at block 324 comprises averaging the buffered images. In some embodiments, seam position detection at block 324 comprises utilizing a convolutional neural network. In some embodiments, seam position detection at block 324 comprises template matching. In some embodiments seam position detection at block 324 comprises determining a distance from the torch to the pipe sections based on signals from one or more other sensors, such as for example a laser scanner and/or a pair of spot laser sensors. In some embodiments, seam position detection at block 324 comprises determining a gap size between the edges of the pipe sections being welded. In some embodiments, seam position detection at block 324 comprises a combination of two or more of the foregoing acts. In a currently preferred embodiment, seam position detection at block 324 comprises localization of features using a convolutional neural network, temporally and/or spatially filtering the images, followed by detection of corners and edges, and the processor determines a center line between the edges of the pipe sections being welded, and determines a seam position at a location on the center line at a desired height above the edges of the pipe sections being welded.

At block 326, the processor determines if a seam was detected at block 324, and if so (block 326 YES output), the processor updates the seam position at block 328, and provides the controller with the updated seam position for controlling the movement of the torch to track the seam. After block 328, or if a seam is not detected (block 326 NO output), the method proceeds to block 329 where the processor adjusts the ROI for the images to be processed for seam detection. In some embodiments, the processor may not adjust the ROI and block 329 may be omitted. Adjusting the ROI at block 329 may, for example, comprise selecting an area of the image encompassing the welding arc and the edges of the pipe sections being welded. When a seam is detected (block 326 YES output), adjusting the ROI may, for example, comprise selecting a smaller area of the image that includes features used for seam detection. When a seam is not detected (block 326 NO output), adjusting the ROI may, for example, comprise selecting a larger area of the image to increase the likelihood of seam detection. After block 329 the method returns to block 304 where the processor reads the next frame.

Figure 3C:
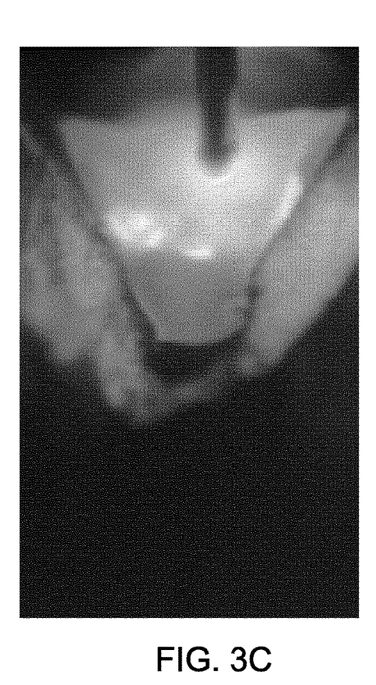
FIG. 3C shows an example stitch start frame.

At block 330, the processor analyzes the current frame, or a set of recently buffered frames, to detect whether the torch is over a stitch. Stitch detection at block 330 may, for example, comprise utilizing a convolutional neural network, evaluating the brightness of the image, and/or template matching. FIG. 3C shows an example image of a stitch start. At block 332 the processor determines if the beginning of a stitch or a "stitch start" (i.e. when the torch moves onto a stitch) is detected. If the start of a stitch is detected (block 332 YES output), the processor stores the position of the stitch start (e.g., an angular position) at block 334, then sets the status to "Stitch" at block 336. The processor also provides indication of the stitch start to the controller for adjusting the welding parameters in response to the stitch detection. Adjusting the welding parameters in response to stitch start detection may, for example, comprise increasing one or more of voltage trim, wire speed, weave amplitude, weave frequency, and positioner speed. The processor and/ or controller may also store the angular position of the stitch for adjusting welding parameters during one or more subsequent passes, as discussed below. After block 336, or if a stitch start is not detected (block 332 NO output), the method returns to block 304 where the processor reads the next frame.

Figure 3D:
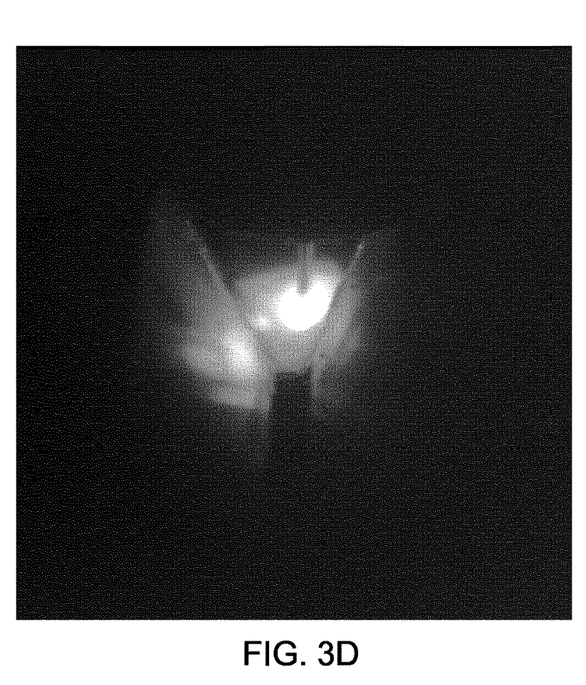
FIG. 3D shows an example stitch end frame.

At block 306, when the status is "Stitch" the method proceeds to block 340. At block 340 the processor predicts where the seam is located about the stitch. Prediction of seam location at block 340 may, for example, comprise utilizing a model of the torch movement stored in a memory accessible to the processor and/or feedback from the controller on the positioner and torch movements. At block 342 the processor analyzes the current frame, or a set of recently buffered frames, to detect whether the torch is over a still stitch, similar to block 330 discussed above. FIG. 3D shows an example image of a stitch end. At block 344, the processor determines if a "stitch end" (i.e. when the torch moves past stitch) is detected. If a stitch end is detected (block 344 YES output), the processor stores the position of the stitch end (e.g., an angular position) at block 346, then sets the status to "pool" at block 348. The processor also provides indication of the stitch end to the controller for adjusting the welding parameters in response to the stitch detection. Adjusting the welding parameters in response to stitch end detection may, for example, comprise decreasing one or more of voltage trim, wire speed, weave amplitude, weave frequency, and positioner speed. The processor and/or controller may also store the angular position of the stitch for adjusting welding parameters during one or more subsequent passes, as discussed below. After block 348, or if a stitch end is not detected (block 344 NO output), the method returns to block 304 where the processor reads the next frame.

In some embodiments, the method 300 may also comprise determining completion of the root pass and automatically transitioning into a method for controlling the welding system during other passes. For example, the controller may monitor progress of the positioner (e.g. by receiving signals from an encoder on the positioner) and signal the processor when one revolution of the pipes has been completed to transition the processor into an "other pass" method of operation, as described below. In some embodiments, a convolutional neural network may process the image frames to detect the end of the pass. In some embodiments, an operator may be provided with an option to "pause" the welding operation between passes, for example if the seam needs to cool down before a next pass.

Figure 3E:
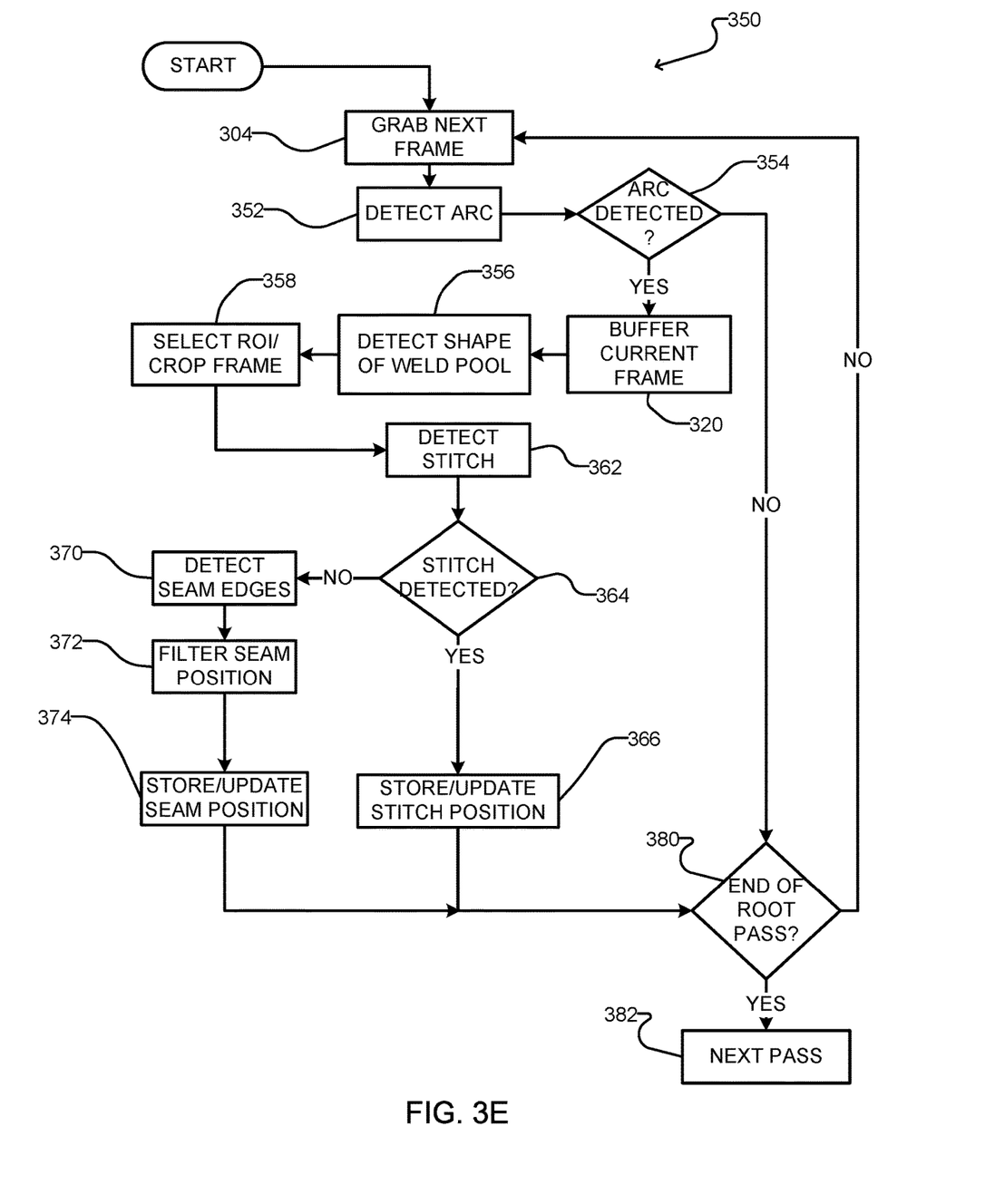
FIG. 3E is a flowchart illustrating steps of an example method for controlling a robotic welding system during a root pass according to another embodiment.

FIG. 3E is a flowchart illustrating steps of an example method 350 for monitoring welding of a root pass and tracking the seam according to another embodiment. Method 350 is similar in some respects to method 300 of FIG. 3, for example in that stitch and seam positions are detected solely from the images acquired from the camera, and such detections may be made with a combination of deep learning techniques, such as utilizing convolution neural networks, and image processing techniques such as template matching and edge detection. Method 350 is also simplified in some respects as compared to method 300 of FIG. 3, for example in that status indicators are not used, and stitch detection is not separately broken down into detecting stitch starts and ends. As described below, method 350 also differs from method 300 of FIG. 3 in that in method 350 the shape of the weld pool is determined, and such determination may be used to adjust the welding parameters. However, it is to be understood that features of the method 300 of FIG. 3 could be included in the method 350 of FIG. 3E. Likewise, features of the method 350 of FIG. 3E could be included in the method 300 of FIG. 3, or in methods for subsequent passes such as method 400 described below with reference to FIG. 4.

Method 350 starts with block 304, where the processor receives a frame from the camera. The processor analyzes the frame to detect a weld arc at block 352 and determines if an arc is present at block 354. In some embodiments this may comprise utilizing a convolutional neural network. In some embodiments this may comprise evaluating the relative brightness of regions of the image. When an arc is not detected (block 354 NO output), the method 350 proceeds to block 380 where the processor determines if the robotic welding system has reached the end of the root pass.

When an arc is detected (block 354 YES output), at block 320 the processor stores either all or a portion of the current frame in a buffer. In some embodiments, the processor stores a region of interest (ROI) in the buffer, the ROI comprising an area surrounding the brightest portion of the frame, which is where the welding arc is located.

After block 320, the method 350 proceeds to block 356 where the processor analyzes the image to detect the shape of the weld pool, and generates a weld pool control signal for adjusting operation of the robotic welding system. In some embodiments, block 356 comprises determining a slope of an upper surface of the weld pool. In some embodiments this comprises of utilizing convolution neural networks to locate the edges of the weld pool. In some embodiments this involves image processing to detect the location of the arc and track it spatially and temporally. In some embodiments these techniques are combined. In some embodiments, a weld pool control signal is derived from the length and slope of a line which describes the location of the center of the welding arc over time. In some embodiments this control signal is derived in combination with previously detected locations of the seam edges. In some embodiments, block 356 comprises determining an angle between a line approximating the top the weld pool and horizontal. For example the processor can determine an approximation of levelness of the top weld pool based on the center of the arc as tracked over time or the top corners of the weld pool (or a combination of the two).

The weld pool control signal may be provided to the controller 103 and used to adjust the movement of the robotic arm with the welding torch. For example, in some embodiments, the difference of the angle from horizontal may be used to change the angle of the "weave axis" of the welding arm to compensate (e.g. by adjusting the position of the robotic welding system to change the relative angle of the torch arm and the pipe sections). In some embodiments the difference of the angle from horizontal and the position of the line relative to the tracked seam position may be used to provide an additional adjustment to a detected seam position.

At block 358, the processor selects a region of interest to analyze further, for example based on the detected arc. At block 362 the processor analyzes the image to detect a stitch. When a stitch is detected (block 364 YES output), the processor stores the position of the stitch and/or updates a previously stored stitch position at block 366. When no stitch is detected (block 364 NO output), the process analyzed the image to detect seam edges at block 370, then filters the seam position at block 372. Filtering the seam position at block 372 may, for example comprise applying a smoothing filter, using a mechanism such as a Kalman filter, similarly to as described above with reference to block 322 of method 300. Filtering makes the signal more smooth and consistent, and more resistant to any error/inaccuracies in individual detections of the seam by filtering it with regards to the recent history of seam detection. At block 374, the processor stores the position of the seam and/or updates a previously stored seam position.

After block 366 or block 372, the method 350 proceeds to block 380, where the processor determines if the robotic welding system has reached the end of the root pass. For example, the controller may monitor progress of the positioner (e.g. by receiving signals from an encoder on the positioner) and signal the processor when one revolution of the pipes has been completed. Until the end of the root pass (block 380 NO output), the method 350 returns to block 304 after block 380. At the end of the root pass (block 380 YES output), the method 350 proceeds to block 382 and execute a subsequent pass method as described below.

Figure 4:
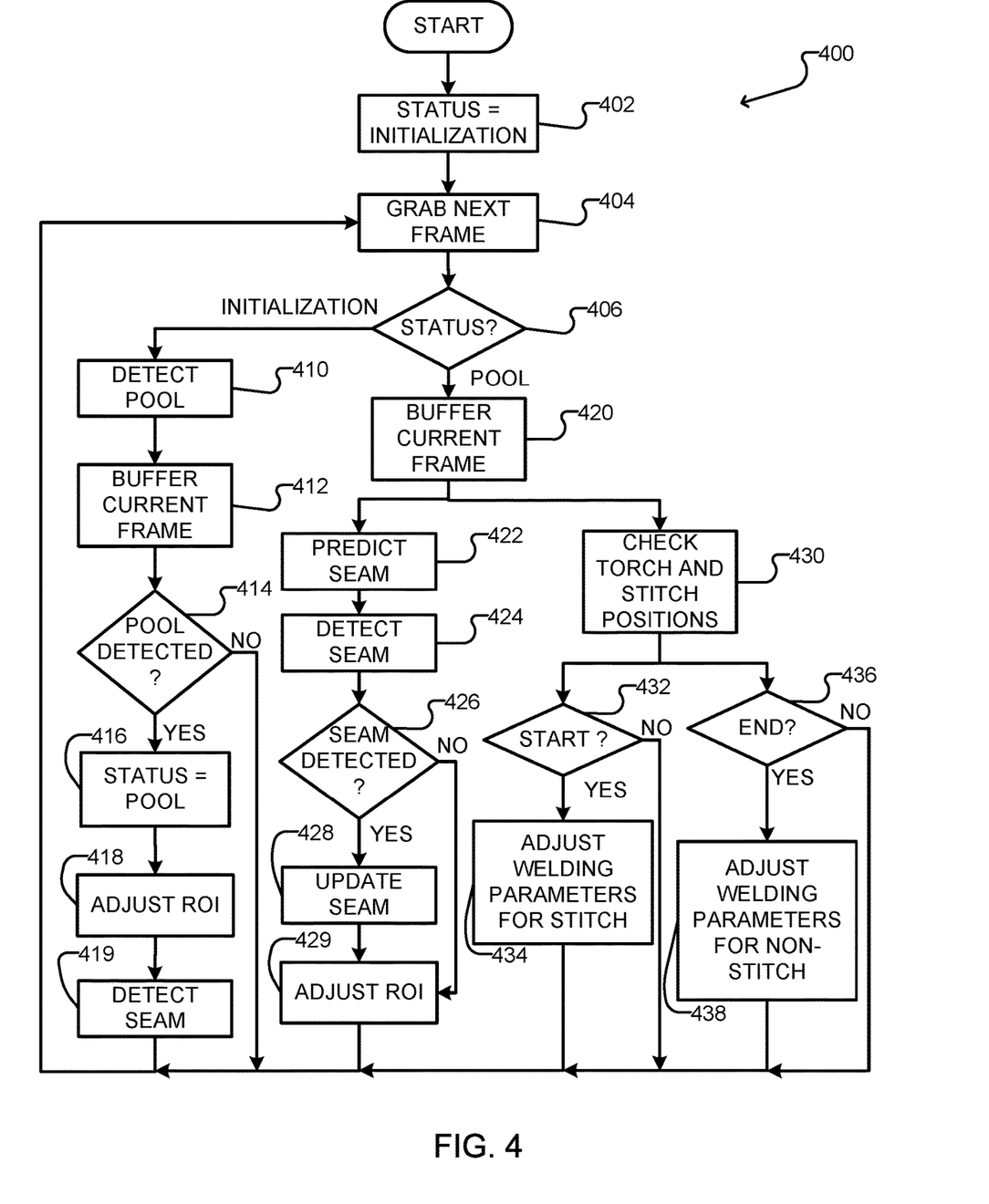
FIG. 4 is a flowchart illustrating steps of an example method for controlling a robotic welding system during a subsequent, non-root pass (which may be referred to as a "fill" or a "cap" pass) according to one embodiment.
Figure 4A:
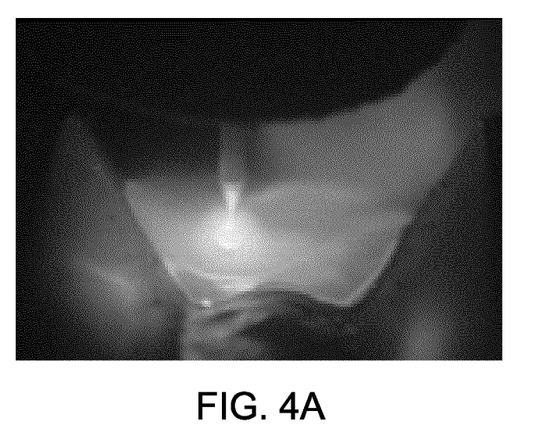
FIGS. 4A-C respectively show example frames from a first fill pass, a second fill pass, and a cap pass of an example four pass pipe weld.
Figure 4B:
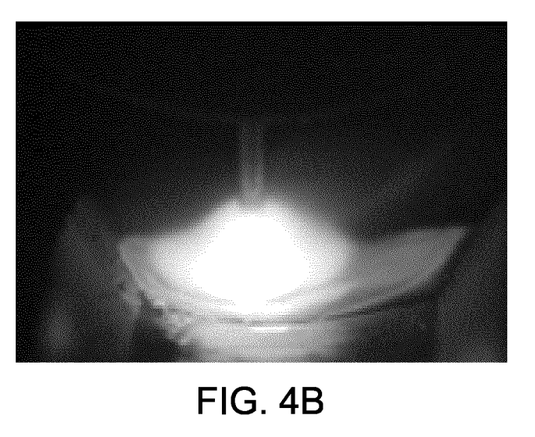
Figure 4C:
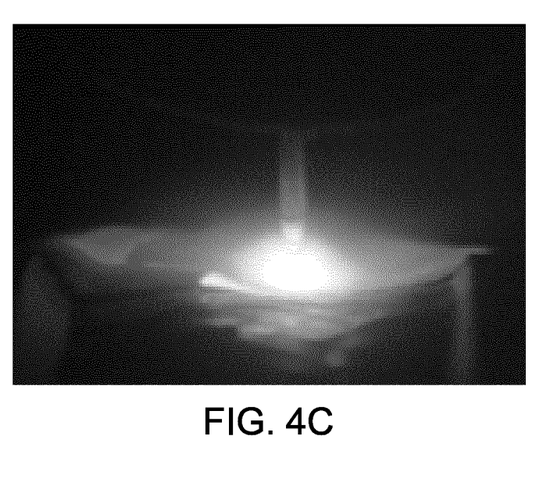

After the root pass is complete (the torch has completed one circumference around the pipe sections), one or more additional passes are typically required to complete the welding operation, and the processor may execute a different method for monitoring the other passes. The passes after the root pass may be referred to as "fill passes" or "cap passes". Since the stitches are not blocking the view in passes other than the root pass, the seam detection procedure for other passes is focused on the extraction of the seam, as shown in the example method 400 of FIG. 4. FIGS. 4A, 4B and 4C respectively show sample frames of the first and second fill passes as well as the cap pass (in a four-pass pipe welding procedure) that contain enough information for detecting the seam. The processor uses information from such frames as well as frames with various levels of brightness to detect the seam. In some embodiments, during one or more subsequent passes, the processor also updates the weld parameters on the previously determined angular position of the stitches for better penetration.

The method 400 starts after the root pass is complete, and at block 402 the processor sets the status to "Initialization". At block 404, the processor reads a frame from the camera. At block 406, the processor checks the status, which is initially set to "Initialization" so the method proceeds to block 410. At block 410 the processor analyzes the frame to detect if a weldpool is present in the image. Weldpool detection may, for example, comprise analyzing the image similarly to as described with respect to block 310 above, and detecting a weldpool once the processor has a certain level of confidence that a weldpool is present. At block 412 the processor stores either all or a portion of the current frame in a buffer. In some embodiments, the processor stores a region of interest (ROI) in the buffer, the ROI comprising an area surrounding the brightest portion of the frame, which is where the welding arc is located.

At block 414, if a pool is detected in the current frame (block 414 YES output), the processor sets the status to "Pool" at block 416. At block 418 the processor adjusts the ROI for the images to be processed for seam detection. In some embodiments, the processor may not adjust the ROI and block 418 may be omitted. Adjusting the ROI at block 418 may, for example, comprise selecting an area of the image encompassing the welding arc and the edges of the pipe sections being welded. After block 418, the method proceeds to block 419, where the processor analyzes the image to detect the seam position. Seam position detection at block 419 may comprise, for example, detecting edges and/or lines in the image to locate the edges of the pipe sections being welded. In some embodiments, seam position detection at block 419 comprises spatially filtering the image. In some embodiments, seam position detection at block 419 comprises utilizing a convolutional neural network. In some embodiments, seam position detection at block 419 comprises template matching. In some embodiments seam position detection at block 419 comprises determining a distance from the torch to the pipe sections based on signals from one or more other sensors, such as for example a laser scanner and/or a pair of spot laser sensors. In some embodiments, seam position detection at block 419 comprises determining a gap size between the edges of the pipe sections being welded. In some embodiments, seam position detection at block 419 comprises a combination of two or more of the foregoing acts. In a currently preferred embodiment, seam position detection at block 419 comprises localization of features using template matching or a convolutional neural network, temporally and/or spatially filtering the image, followed by detection of edges and lines and the processor determines a center line between the edges of the pipe sections being welded and determines a seam position at a location on the center line at a desired height above the edges of the pipe sections being welded. After block 419, or if a pool is not detected in the current frame (block 414 NO output), the method returns to block 404 where the processor reads the next frame.

At block 406, when the status is "Pool" the method proceeds to block 420 where the processor buffers some or all of the current frame. After block 320, the method proceeds to block 422, and optionally also to block 430. When block 430 is included, the steps at blocks 422 and 430 (as well as the subsequent steps, where applicable) are performed in parallel for each frame.

At block 422 the processor predicts a seam position. Prediction of seam location at block 422 may, for example, comprise utilizing a Kalman filter or a Particle filter based on the latest detected seam location. The filter utilized at block 422 may comprise, for example, a Standard Kalman Filter, Extended Kalman Filter, Unscented Kalman Filter, Fast Kalman Filter, Unscented Particle Filter, SIR Particle Filter, or other suitable filter. The filter may be designed based on a model of torch movement. In some embodiments, a random walk model may be used to model the movement of the torch (e.g. the filtering may use a model with an identity state transition matrix, with the value of process and measurement noises set accordingly). Prediction of seam location at block 422 may, for example, comprise utilizing a model of the torch movement stored in a memory accessible to the processor and/or feedback from the controller on the positioner and torch movements. The processor provides the controller with the predicted seam position for controlling the movement of the torch to track the seam.

At block 424, the processor analyzes the current frame, or a set of recently buffered frames, to detect the seam position. Seam position detection at block 424 may comprise, for example, detecting edges and/or lines in the buffered images to locate the edges of the pipe sections being welded. In some embodiments, seam position detection at block 424 comprises spatially filtering the buffered images. In some embodiments, seam position detection at block 424 comprises averaging the buffered images. In some embodiments, seam position detection at block 424 comprises template matching. In some embodiments, seam position detection at block 424 comprises utilizing a convolutional neural network. In some embodiments seam position detection at block 424 comprises selecting a smaller region of interest within the frame(s) for further processing, as discussed below. In some embodiments, seam position detection at block 424 comprises determining a gap size between the edges of the pipe sections being welded. In some embodiments, seam position detection at block 424 comprises a combination of two or more of the foregoing acts. In a currently preferred embodiment, seam position detection at block 424 comprises localization of features using a convolutional neural network or template matching, temporally and/or spatially filtering the images, followed by detection of edges and lines and the processor determines a line between the edges of the pipe sections being welded and determining a seam position at a location on the line at a desired height above the edges of the pipe sections being welded.

At block 426, the processor determines if a seam was detected at block 424, and if so (block 426 YES output), the processor updates the seam position at block 428, and provides the controller with the updated seam position for controlling the movement of the torch to track the seam. After block 428, or if a seam is not detected (block 426 NO output), the method proceeds to block 429 where the processor adjusts the ROI. In some embodiments, the processor may not adjust the ROI and block 429 may be omitted. Adjusting the ROI at block 429 may, for example, comprise selecting an area of the image encompassing the welding arc and the edges of the pipe sections being welded. When a seam is detected (block 426 YES output), adjusting the ROI may, for example, comprise selecting a smaller area of the image that includes features used for seam detection. When a seam is not detected (block 426 NO output), adjusting the ROI may, for example, comprise selecting a larger area of the image to increase the likelihood of seam detection. After block 429 the method returns to block 404 where the processor reads the next frame.

The steps at blocks 430-438 may be desirable in situations where stitches are not completely or smoothly covered by the root pass, such that adjustment over the stitches during other passes is beneficial. In other situations, the steps at block 430-438 may be omitted. At block 430, the processor checks the current torch position and the stored angular positions of stitch starts and stitch ends. If the torch is at a stitch start (block 432 YES output), at block 434 the processor provides indication of the stitch start to the controller for adjusting the welding parameters. Adjusting the welding parameters in response to stitch start detection may, for example, comprise increasing voltage trim, wire speed, weave amplitude, weave frequency, and positioner speed. If the torch is at a stitch end (block 436 YES output), at block 438 the processor provides indication of the stitch end to the controller for adjusting the welding parameters. Adjusting the welding parameters in response to stitch end detection may, for example, comprise decreasing voltage trim, wire speed, weave amplitude, weave frequency, and positioner speed. After block 434 or 438, or if no start or end is determined (blocks 432 and 434 NO outputs), the method returns to block 404 where the processor reads the next frame.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

The present disclosure may be embodied in other specific forms without departing from its spirit or essential characteristics. The described embodiments are to be considered in all respects only as illustrative and not restrictive.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The invention claimed is:

1. A method for controlling a robotic welding system during automatic welding together of two pipe sections in a spool welding operation wherein the two pipe sections are held in fixed relation to each other by a plurality of stitches at an interface between the two pipe sections, the robotic welding system having a torch arm holding a welding torch, a controller for controlling motion of the torch arm, and a processor operably coupled to the controller and a camera positioned to capture images of an area around a welding arc, and a positioner on which the two pipe sections are mounted for rotating the two pipe sections in relation to the robotic welding system, the method comprising:
receiving, by the processor, an arc on signal from the controller which controls the robotic welding system to start the welding operation and controls the positioner to start rotating the two pipe sections;
rotating the two pipe sections and the robotic welding system in relation to each other while continuously:
capturing and buffering a plurality of frames of an interface between the two pipe sections with the camera while the welding operation is ongoing;
processing the plurality of frames to determine a seam position while the welding operation is ongoing;
controlling the robotic welding system to move the torch arm to track the seam position while the welding operation is ongoing;
processing the plurality of frames to detect whether the welding torch is over one of the plurality of stitches while the welding operation is ongoing;
determining a stitch start in response to detecting the welding torch moving over one of the plurality of stitches while the welding operation is ongoing;
controlling the robotic welding system to adjust welding parameters in response to determining the stitch start while the welding operation is ongoing;
determining a stitch end in response to detecting the welding torch moving past one of the plurality of stitches while the welding operation is ongoing; and
controlling the robotic welding system to adjust welding parameters in response to determining the stitch end while the welding operation is ongoing.

2. The method of claim 1 wherein processing the plurality of frames to determine a seam position comprises detecting an edge of each of the two pipe sections and determining the seam position based on the detected edges.

3. The method of claim 1 comprising processing the plurality of frames to detect a shape of the weld pool and controlling the robotic welding system to adjust welding parameters based on the detected shape of the weld pool.

4. The method of claim 3 wherein controlling the robotic welding system to adjust welding parameters based on the detected shape of the weld pool comprises changing an angle between a weave axis of the torch arm and the two pipe sections.

5. The method of claim 1 comprising processing the plurality of frames to determine a gap size at the interface between the two pipe sections and controlling the robotic welding system to adjust welding parameters in response to the determined gap size.

6. The method of claim 1 comprising:
storing an angular position of each stitch start and stitch end;
monitoring an angular position of the welding arc; and
controlling the robotic welding system to adjust welding parameters when the angular position of the welding arc is over a stitch in one or more subsequent passes.

7. The method of claim 1 wherein controlling the robotic welding system to adjust welding parameters in response to determining the stitch start comprises increasing one or more of voltage trim, wire speed, weave amplitude, weave frequency, and positioner speed.

8. The method of claim 7 wherein controlling the robotic welding system to adjust welding parameters in response to determining the stitch end comprises decreasing one or more of voltage trim, wire speed, weave amplitude, weave frequency, and positioner speed.

9. The method of claim 1 comprising, when the welding arc is over a stitch during a root pass, predicting the seam position by utilizing a filter based on a most recently detected seam position.

10. The method of claim 9 wherein the filter comprises a standard Kalman filter, extended Kalman filter, unscented Kalman filter, fast Kalman filter, unscented particle filter, or SIR particle filter.

\* \* \* \* \*